J. R. BECKETT.
UNIVERSAL ANGLE PLATE.
APPLICATION FILED OCT. 4, 1913.
1,155,987.
Patented Oct. 5, 1915.
2 SHEETS—SHEET 1.
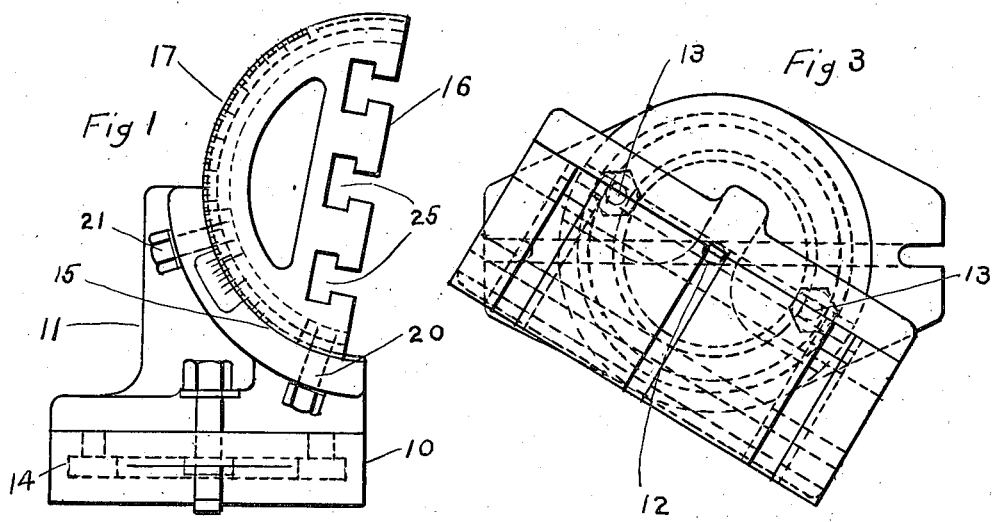
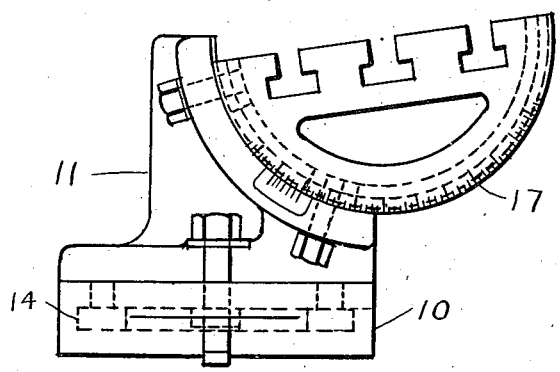
Witnesses
Inventor
John R Beckett
by Clyde L. Rogers
his Attorney

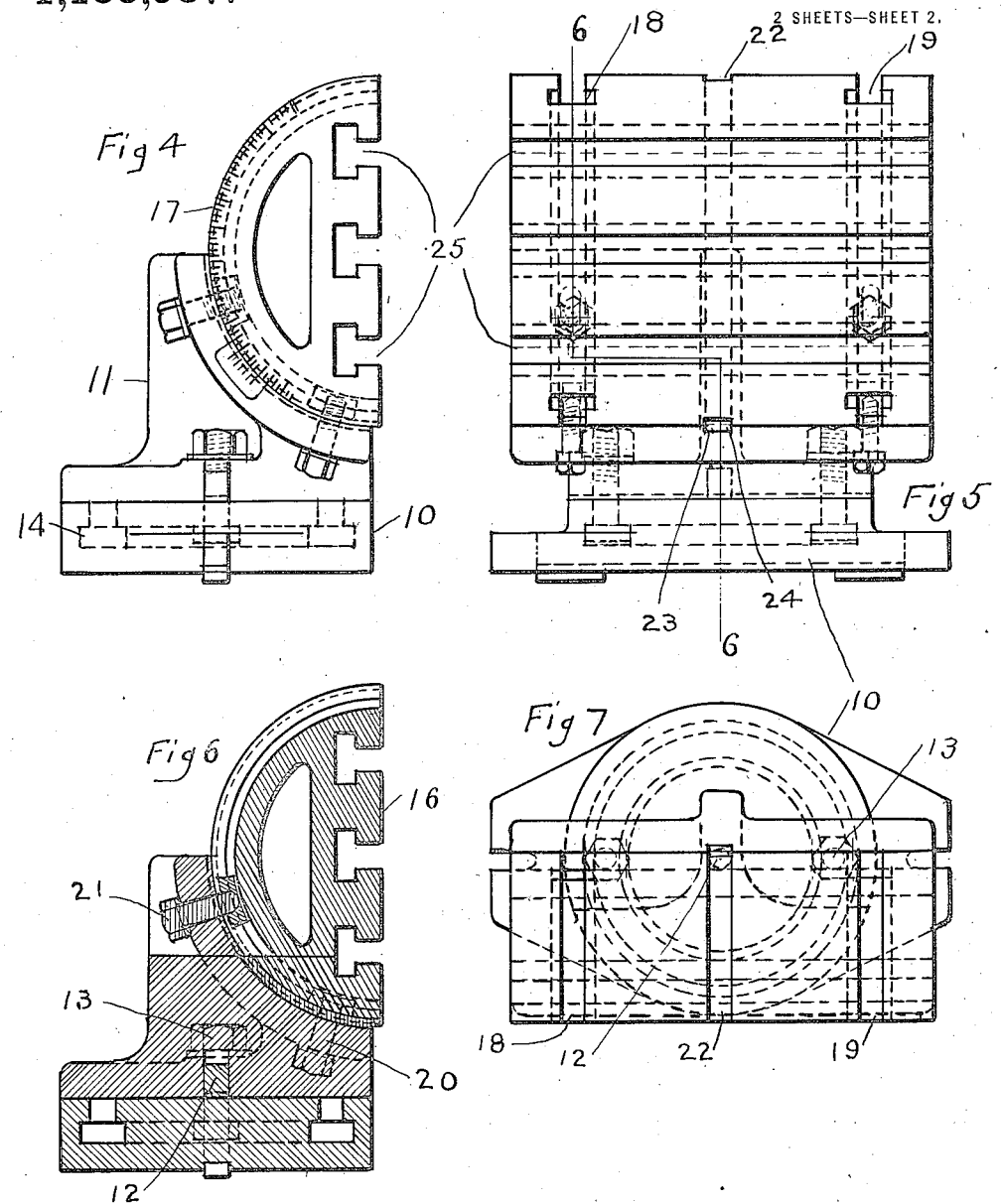

UNITED STATES PATENT OFFICE.

JOHN R. BECKETT, OF BOSTON, MASSACHUSETTS.

UNIVERSAL ANGLE-PLATE.

1,155,987.  Specification of Letters Patent.  Patented Oct. 5, 1915.

Application filed October 4, 1913. Serial No. 793,306.

*To all whom it may concern:*

Be it known that I, JOHN R. BECKETT, a citizen of the United States, and resident of Boston, county of Suffolk, State of Massachusetts, have invented an Improvement in Universal Angle-Plates, of which the following description, in connection with the accompanying drawings, is a specification, like characters on the drawings representing like parts.

The present invention relates to so-called plates or blocks adapted to hold work pieces more especially of metal in position to be operated on for any desired machining operation such as facing, slotting, boring, milling and the like.

A prime object of the invention is to provide a work holding plate or support of this kind having a capacity of universal adjustment to present the work in any desired relation to the tool, while at the same time offering an absolutely rigid unyielding backing to the work piece whereby chattering is minimized and any displacements of the work in the machining operation prevented with certainty.

In accordance with my invention while the work is held rigidly and securely and with a capability of being swung or tilted to any desired angle for presentation to the tool, the parts of the device are so arranged that the lower or supporting parts whereon the work holding block proper is adjustable, do not project so as to be in the way of the tool or interfere with the operation thereof at any time.

The above and other objects and features of the invention will be better understood from the following detailed description taken in connection with the accompanying drawings and will be thereafter pointed out in the appended claims.

Referring to the drawings: Figure 1 is a side elevation showing a preferred form of my improved device with the work holding block proper at or near one extreme of its range of tilting adjustment; Fig. 2 is a similar view showing the work holding block at or near the other limit of its range of adjustment; Fig. 3 is a plan view illustrating the capacity of the device for adjustment about a vertical axis; Fig. 4 is a side elevation showing the work holding block with its face vertical; Fig. 5 is a front view looking from the right in Fig. 4; Fig. 6 is a sectional view on line 6—6 of Fig. 5; and Fig. 7 is a plan with the parts corresponding in position to Figs. 4 and 5.

A base piece or stand 10 of usual form having parallel top and bottom faces is provided, this being set upon or secured to the table of the machine in proper position relative to the tool. On this base stand is fitted a rest backing 11 with a capability of adjustment about a vertical axis 12, this backing rest being held to the stand base in its various adjusted positions by T headed bolts 13 fitted in an undercut annular slot 14 in the base stand as is usual. The rest backing 11 is formed with an arcuate backing surface 15 shown as a substantially quadrantal curve extending from the horizontal at the front of the device to the vertical at a point shown as substantially directly over the axis of vertical adjustment 12. To this backing surface is fitted the work holding block 16 having its back 17 formed on a substantially semi-cylindrical curve corresponding to that of the seat which it is to fit. As a means for clamping the block 16 securely to its seat on the backing piece 11 I provide near the ends of said block, peripheral undercut grooves 18, 19, in which fit curved T nuts of bolts 20, 21, shown as passed through the heavy arcuate flange constituting the seat 15, near the ends thereof.

As a means for further guiding the block 16 in its tilting adjustment and to insure accuracy of the same, I preferably provide a peripheral slot 22 intermediate the length thereof with a corresponding opposite slot 23 in the rest backing and fit into one of said slots, preferably the latter, a rib piece 24 which, closely fitting the other slot, accurately guides the block as it swings. The work holding piece 16 preferably has its face equipped with undercut T slots 25 or like provision for clamping the work thereto. As best seen in Figs. 3 and 5 the heavy arcuate flange constituting the quadrantal seat 15 extends the full length of the block 16, and this block is as shown substantially longer than the width across its face.

By reference to the different positions of block 16 as shown for example in Figs. 1, 2 and 4, it will be seen that the work clamped to the face of said block may be held at any position of tilting adjustment desired, from the one extreme where the work supporting face overhangs the vertical as in Fig. 1 to the other extreme where it is tilted up in front beyond the horizontal as in Fig. 2, and that throughout this range of tilting adjustment there is at all times a wide, rigid, and substantial backing of the work and its supporting block 16 against substantially the full quadrantal surface 15 throughout the width and length thereof.

It is to be particularly noted that in my improved construction by reason of the fact that the arcuate cradle seat is substantially forward of the vertical axis, as shown, substantially tangential thereto, in connection with the plane flat work receiving face, it is possible to fix work pieces of any size and with projecting parts, to the work receiving face and bring the same to any angle whatsoever desired without hindrance by any portion of the work coming against any part of the cradle or base; i. e., the work receiving face can be adjusted through substantially a quadrant in any direction without having any part of the cradle or base support projected into the plane thereof. It is to be further observed that in all this range of tilting adjustment of block 16, the underneath supporting parts, i. e., the rest backing 11 and the base stand 10 do not project forward at any time in a manner to interfere with the operation of the tool; on the other hand throughout most of the range of adjustments the work supporting block 16, though rigidly and strongly supported, projects out some little distance in front of the parts 10, 11, thus permitting the tool to attack the work clamped to the face of said block at all times to the best advantage. By reason of the quadrantal form of the backing surface 15 which thus constitutes what may be termed a "cradle" rest, there is always a portion of said rest extending at least to a point substantially back of the center of block 16 and thus adapted to receive and withstand the working thrusts. It is to be observed that the arrangement of the arcuate rest 15 extending as it does from a point substantially directly above the center of vertical adjustment 12 downwardly and forwardly to the front of the device, causes the working thrusts and strains to be transmitted to the stand piece 10 in a manner so that they are taken up and dissipated most advantageously. By referring to Figs. 1 and 2 it will be seen that by reason of the fact that the securing bolts 20, 21, are disposed some little distance from the extremities of the backing seat 15, the block 16 may be set and clamped by said bolts in the extreme positions shown beyond the vertical and horizontal, respectively, which is often of advantage in handling certain kinds of work.

I consider the described construction whereby I am able to attain a universal adjustment of the face of the work holding block to any desired angle by means of the compound adjustments about the vertical axis 12 and on the arcuate cradle rest 15, to be of special value and importance in the combination wherein such cradle rest formed on the backing 11 constitutes a part, for the reason that this provides a work holding plate having at the same time the attributes of rigidity and strength to a high degree along with the capability of universal adjustment to present the work in any required manner to the tool. I preferably provide suitable graduations as shown to indicate the extent of angular adjustments in each direction.

I am aware that the invention can be embodied in other specific forms as to various details without departing from the spirit thereof and I therefore do not desire to be limited to the precise embodiment herein shown but desire such embodiment to be considered as illustrative and not restrictive and refer to the appended claims rather than to the foregoing description to indicate the scope of the invention.

Having described my invention, what I claim as new and desire to secure by Letters Patent is:

1. A universal work holder for metal working machines, comprising a block having a plane work receiving face with provision for clamping work thereto and a back of part cylindrical form, a backing member formed with an extended arcuate seat for said block, said parts being arranged to permit adjustment of said block about a horizontal axis, and being equipped with T-bolt clamping means for clamping said block to said member in any adjusted position, and means for rigidly holding said backing member with a capability of angular adjustment about a vertical axis, said means including T-bolt clamps operative in an annular slot, said vertical axis being substantially farther back than said horizontal axis, said block and backing member and the holding means therefor being so proportioned and disposed that the work receiving face may be adjusted through substantially a quadrant in any direction before any other part is projected into the plane thereof.

2. A universal work holder for metal working machines, comprising a block having a plane work receiving face and a back of part cylindrical form, a backing member formed with an extended arcuate seat for said block, said parts being arranged to permit adjustment of said block about a horizontal axis, T-bolt means for clamping said block to said backing member, and means including a T-bolt clamp for rigidly holding said backing member with a capability of angular adjustment about a vertical axis, said vertical axis being approximately in a line tangential to said arcuate seat, said block and backing member and the holding means therefor being so proportioned and disposed that the work receiving face may be adjusted through substantially a quadrant in any direction before any other part is projected into the plane thereof.

3. A universal work holder of the kind described, comprising a stand base having provision for supporting a backing member thereon with a capability of angular adjustment about a vertical axis, a backing member on said base formed with a cradle seat of substantially elongated quadrantal form, said backing member having T-bolt clamping means passed therethrough and engaged in an annular slot of said base, and a work holding block fitted to said seat for angular horizontal adjustment having T-bolt clamping means engaged with the periphery thereof for clamping it to said seat, said block being so mounted that its face may be adjusted through an angle of substantially ninety degrees in any direction before said base or said cradle seat is projected into the plane of said face.

In testimony whereof, I have signed my name to this specification, in the presence of two subscribing witnesses.

JOHN R. BECKETT.

Witnesses:
   LOUISE A. JORDAN,
   CLYDE L. ROGERS.